United States Patent
Gottfriedsen et al.

(10) Patent No.: US 12,288,643 B2
(45) Date of Patent: Apr. 29, 2025

(54) POT MAGNET FOR A PLUNGER COIL ARRANGEMENT

(71) Applicant: Wipotec GmbH, Kaiserslautern (DE)

(72) Inventors: Jan Gottfriedsen, Waldfischbach-Burgalben (DE); Bernd Zinke, Mandelbachtal (DE)

(73) Assignee: Wipotec GmbH, Kaiserslautern (DE)

( * ) Notice: Subject to any disclaimer, the term of this patent is extended or adjusted under 35 U.S.C. 154(b) by 114 days.

(21) Appl. No.: 17/927,342

(22) PCT Filed: May 25, 2021

(86) PCT No.: PCT/DE2021/100454
§ 371 (c)(1),
(2) Date: Jul. 30, 2023

(87) PCT Pub. No.: WO2021/239188
PCT Pub. Date: Dec. 2, 2021

(65) Prior Publication Data
US 2024/0233997 A1 Jul. 11, 2024

(30) Foreign Application Priority Data
May 26, 2020 (DE) .......................... 102020114058.4

(51) Int. Cl.
*H01F 7/02* (2006.01)

(52) U.S. Cl.
CPC ........... *H01F 7/021* (2013.01); *H01F 7/0294* (2013.01)

(58) Field of Classification Search
CPC .......... H01F 7/021; H01F 7/0294; G01G 7/04
See application file for complete search history.

(56) References Cited

U.S. PATENT DOCUMENTS

| 4,150,730 A | 4/1979 | Knothe |
| 7,948,341 B2 | 5/2011 | Tellenbach |

(Continued)

FOREIGN PATENT DOCUMENTS

| JP | H01250024 A | 5/1989 |
| JP | H0664126 U | 9/1994 |

(Continued)

OTHER PUBLICATIONS

International Search Report issued Sep. 10, 2021, in PCT/DE2021/100454.

(Continued)

*Primary Examiner* — Mohamad A Musleh
(74) *Attorney, Agent, or Firm* — Calvert Technology Law, PLLC; Nathan H. Calvert

(57) ABSTRACT

A pot magnet for a plunger coil arrangement includes a housing defining an interior with a housing bottom surface and a circumferential surface extending perpendicularly to the housing bottom A permanent magnet unit is arranged in the interior of the housing and includes a permanent magnet and a pole plate. An annular gap for accommodating a plunger coil of a plunger coil arrangement is formed between a circumferential surface of the pole plate and the circumferential surface of the housing interior. The underside of the permanent magnet is bonded to the housing bottom surface. The pole plate is connected to the housing in a manner decoupled from the permanent magnet by a rigid fastening device and is positioned in such a manner that a lower side of the pole plate faces an upper side of the permanent magnet with a gap formed there between.

10 Claims, 1 Drawing Sheet

(56) References Cited

U.S. PATENT DOCUMENTS

| | | |
|---|---|---|
| 11,131,574 B2 | 9/2021 | Bornemann |
| 2010/0294573 A1 | 11/2010 | Baltisberger |
| 2020/0064178 A1 | 2/2020 | Bornemann |

FOREIGN PATENT DOCUMENTS

| | | | |
|---|---|---|---|
| JP | H0989637 A | * | 4/1997 |
| JP | H09089637 A | | 4/1997 |

OTHER PUBLICATIONS

Office Action issued Nov. 28, 2023, in Japanese patent application 2022-570654.

* cited by examiner

POT MAGNET FOR A PLUNGER COIL ARRANGEMENT

TECHNICAL FIELD OF THE INVENTION

The invention concerns a pot magnet for a plunger coil arrangement, in particular a plunger coil arrangement of a balance operating according to the principle of electromagnetic force compensation.

BACKGROUND OF THE INVENTION

Pot magnets for plunger coil arrangements, which are also suitable for measuring purposes, are known in a variety of designs. In principle, such pot magnets consist of a housing which is usually pot-shaped and has a flat housing base from which a housing wall with a circular cross-section extends upwards. The housing can also have a housing lid, which can be screwed to the housing wall, for example. The housing wall can have a recess which serves for the passage of an arm which carries a plunger coil which is accommodated in the housing. The plunger coil resides in an annular gap formed between the inner peripheral surface of the housing wall and the outer peripheral surface of a magnet unit provided in the interior of the housing. The magnet unit consists of a permanent magnet, which is usually designed as a ring magnet with axial magnetization, and a pole plate provided at the upper end of the permanent magnet for equalizing the magnetic field.

When using such a pot magnet for measuring devices, such as a balance operating according to the principle of electromagnetic force compensation, it is necessary that the position of the pole plate be kept extremely constant relative to a zero position of the plunger coil. For this purpose, it has proven insufficient if the permanent magnet is glued with its underside to the inner bottom surface of the housing and the pole plate is connected to the upper side of the permanent magnet, for example, also glued. This is because changes in temperature and humidity can lead to a change in the thicknesses of the adhesive layers and thus to a change in the axial position of the pole plate. This in turn affects the accuracy of the measuring device.

DE 10 2017 110 930 B4 therefore describes a solution in which, on the one hand, the position of the pole plate is kept as constant as possible and, on the other hand, changes in the magnetic field are also avoided when the ambient conditions (in particular temperature and humidity) change. For this purpose, the pole plate is connected to the bottom of the housing for the pot magnet by means of a rigid mechanical connection and the permanent magnet is connected—decoupled from the mechanical connection—to the pole plate, wherein the upper side of the permanent magnet is glued to the lower side of the pole plate for this purpose. Thus, in addition to an essentially constant position of the pole plate (here, at most, insignificant changes due to the temperature-related material expansion of the mechanical connecting elements can have an effect), it is achieved that in the event of a change in thickness of the adhesive layer and the resulting change in the gap width between the pole plate and the permanent magnet, the gap width between the underside of the permanent magnet and the housing base changes accordingly, i.e., the total width of the two gaps remains the same. This means that changes in the ambient conditions only have a negligible effect on the magnetic field generated, since the total width of the gaps remains constant, but the two gaps are filled with different media (adhesive or air).

However, the disadvantage of this structure of a pot magnet shown in DE 10 2017 110 930 B4 is that, especially when using the pot magnet in environments where mechanical shocks or vibrations can occur, the measuring accuracy suffers because the unit consisting of permanent magnet and pole plate experiences changes in position relative to the housing.

DE 10 2017 110 930 B4 further discloses providing additional support elements in addition to the support element which coaxially engages through the permanent magnet. These additional support elements also extend through the permanent magnet without contact magnet and additionally support the pole plate relative to the pot base. However, this measure either increases the space requirement for the entire unit or reduces the strength of the permanent magnet as a result of the recesses for additional the support elements.

SUMMARY OF THE INVENTION

The various embodiments according to the invention address the problem of creating a pot magnet for a plunger coil arrangement, in particular a plunger coil arrangement of a balance operating according to the principle of electromagnetic force compensation, which ensures improved measuring accuracy in environments in which mechanical shocks or vibrations occur and which have improved mechanical stability overall, while maintaining a simple design.

According to a first aspect of the invention, the sensitivity of the pot magnet to mechanical shocks and vibrations is reduced by the fact that the permanent magnet is not connected to the pole plate, as required in DE 10 2017 110 930 B4, but to the housing base. This reduces the "oscillating" suspended mass (possible oscillations are caused by a mechanical connection between the pole plate and the housing or housing base that is not completely rigid), as this is only formed by the mass of the pole plate. According to this aspect of the invention, the permanent magnet is bonded to the housing base with an underside facing the bottom surface of the interior of the housing (housing bottom surface).

Therefore, the pole plate is decoupled from the permanent magnet and only the pole plate has to be connected to the housing by means of a rigid fastening device and positioned in such a way that the bottom side of the pole plate faces the top side of the permanent magnet and a gap with a predetermined gap width is formed between the bottom side of the pole plate and the top side of the permanent magnet.

Implementations according to the first aspect of the invention have the advantage that, in the case of changes in the ambient conditions (in particular the temperature and/or the humidity) which lead to a change in the thickness of the adhesive layer between the housing bottom surface and the underside of the permanent magnet, the sum of the gap widths of the gap between the housing bottom surface and the permanent magnet and of the gap between the permanent magnet and the pole plate remains essentially constant. The sum of these gap widths is at most influenced by a temperature-related change in length of the mechanically rigid connection between the housing and the pole plate, although this effect can be neglected in practice.

Due to the lower mass, which is connected to the housing by means of the mechanical connection, there is a low sensitivity to vibrations or shocks acting on the pot magnet. In addition, there is the advantage that hard impacts that act on the pot magnet, for example during transport of the measuring device in question, can hardly lead to damage, for example deformation or even breakage of the mechanical connection. In addition, the mechanical connection can have a smaller size, so that, given a stipulated size of the entire unit, a permanent magnet with a larger volume can be used or an overall smaller size of the entire unit results (the entire unit including pole plate, permanent magnet and mechanical connection).

The fastening device for holding and fixing the position of the pole plate can be designed in any way according to the invention provided the pole plate is sufficiently rigidly connected to the housing and has sufficient rigidity for the respective application so that vibrations or shocks acting on the housing do not lead to relative movements of the pole plate with respect to the housing. Furthermore, the fastening device should be designed in such a way that sufficient strength is ensured so that shocks or vibrations, which may occur in particular during transport of the measuring device in question or of the pot magnet, do not lead to damage of the pot magnet (for example bending or breaking of the fastening device).

According to some embodiments of the invention, the fastening device includes a support element that extends through the permanent magnet without interfering contact between the support element and the permanent magnet. "Without interfering contact" between a support element and the permanent magnet as used in this disclosure and the accompanying claims means without contact or at least in such a way that, despite contact, a (for example sliding) displacement movement between the permanent magnet and the support element is made possible without generating substantial radial clamping forces that lead to a stick-slip effect in the event of a relative movement of the components in the direction of the engagement. This avoids a situation where a change in the thickness of the adhesive layer between the housing bottom surface and the permanent magnet and a resulting movement of the permanent magnet in its axial direction (i.e. perpendicular to the housing bottom surface) would transfer axial (or also radial) forces to the support element, which would lead to (sudden) movements of the pole plate held by the support element.

In some embodiments, the support element can be screwed to the pole plate and/or the housing. In particular, the support element can be connected to the housing, especially the housing base, by a threaded connection. In addition to threaded connections, the connection between the pole plate and the support element can also be made, for example, by a substance-to-substance bond, such as welding. It is also possible to manufacture these two parts (the pole plate and support element) in one piece.

The support element, when manufactured as a separate element, may have an upper stop surface that cooperates with the bottom surface of the pole plate and a threaded upper pin that engages a threaded hole in the pole plate. Similarly, the support element may have a lower stop surface that cooperates with the housing bottom surface. Where a threaded connection is used, a threaded pin may be provided at the lower end of the support element, and this threaded pin configured to engage in a threaded hole in the bottom of the housing. However, the threaded connection can also be done in such a way that a threaded hole is provided in the bottom of the support element in which a screw engages that protrudes through the bottom of the housing.

According to other embodiments, the support element may comprise a screw and a spacer sleeve, the screw passing through the spacer sleeve. In this case, the spacer sleeve forms the stop surfaces which interact with the underside of the pole plate or the bottom surface of the housing. The front end of the screw engages in a threaded hole in the underside of the pole plate.

In some embodiments the fastening device may comprise one or more peripheral support elements (for example three support elements evenly distributed around the circumference) which support the pole plate relative to the housing bottom surface and which are arranged on the outer circumference of the permanent magnet (that is, about the periphery of the permanent magnet) without interfering contact with the permanent magnet. The one or more peripheral support elements may be provided in addition to a central or coaxial support element. The peripheral support elements may be fixed in their position only by axial clamping forces between the pole plate and the housing, in particular the housing bottom surface. By arranging the peripheral support elements on the outer circumference of the pole plate, tilting movements of the pole plate can be effectively avoided. The one or more peripheral support elements may also be connected (only) with their upper ends to the pole plate, for example the underside of the pole plate, or (only) with their lower ends to the housing, in particular the housing bottom surface. In this case, the pole plate can be mounted in a simple manner by means of a screw passing through the permanent magnet (preferably coaxially). A central or coaxial support element, which also functions as a spacer, is not necessary in this case.

The fastening device included in some embodiments may comprise a support element with a hollow cylindrical shape in cross-section, which surrounds the permanent magnet at its outer circumference without contact (or contacting it in such a way that no large axial forces are transmitted). The assembly can be carried out, as described above, by means of a screw (with or without an additional spacer sleeve) that centrally and coaxially engages through the permanent magnet. This support element may also be connected (only) to the pole plate or (only) to the housing base.

According to some embodiments, the fastening device may exclusively comprise one or more peripheral support elements surrounding the permanent magnet, the pole plate being fastened by being connected to the upper end(s) of the support element(s) and the lower end(s) of the support element(s) being connected to the housing, in particular the housing bottom surface. The connection of the upper or lower ends can be a non-detachable connection, for example a substance-to-substance bond (including the production of the pole plate and the at least one peripheral support element as a single piece). It is also conceivable to manufacture the pole plate and the at least one peripheral support element in one piece from the same material, which must then, however, be ferromagnetic. In this case, however, the cross-section of the at least one peripheral support element must be chosen very small in order to make the magnetic resistance so large that a magnetic short-circuit is avoided. In this variant with a peripheral support element that exclusively surrounds the permanent magnet, a coaxial breakthrough of the permanent magnet can be dispensed with and a cylindrical, in particular circular-cylindrical permanent magnet (with axial magnetization) can be used instead of a ring magnet.

These and other aspects, advantages, and features of the invention will be apparent from the following description of representative embodiments, considered along with the accompanying drawings.

DESCRIPTION OF REPRESENTATIVE EMBODIMENTS

Figure 1:
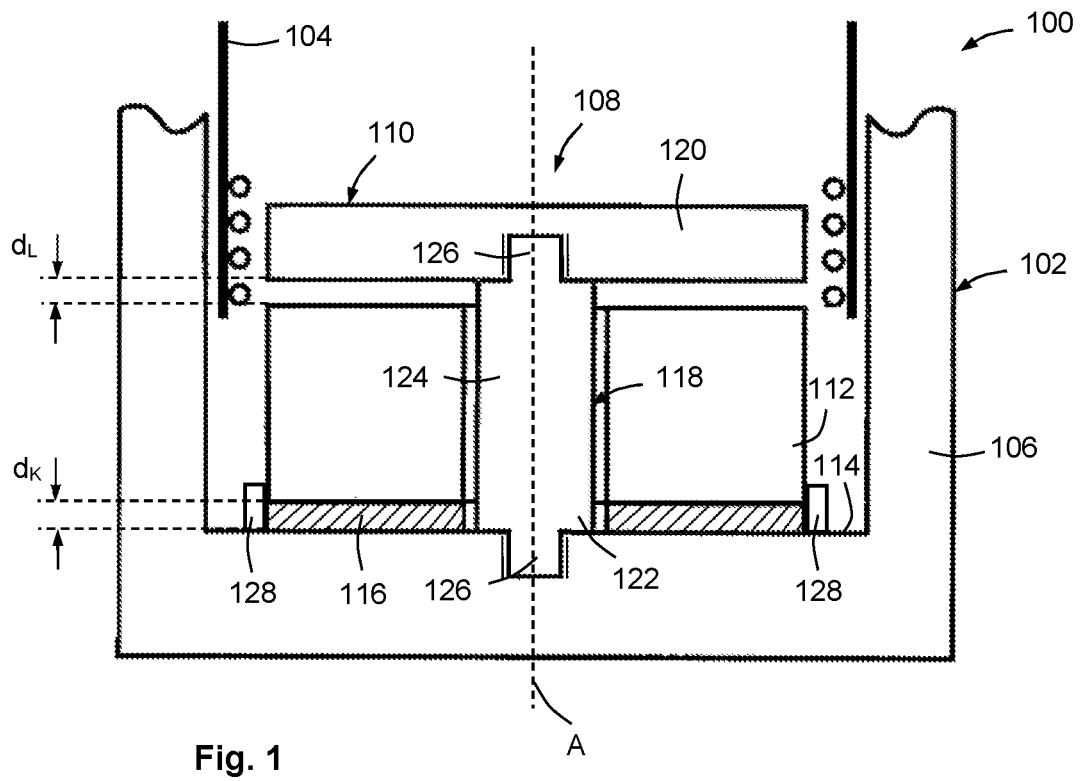
FIG. 1 shows a first embodiment of a pot magnet according to the invention with a central support element coaxially engaging through the permanent magnet; the support element having a threaded extension on both sides and thus engaging in corresponding threaded bores in the pole plate or the housing base.

FIG. 1 shows a plunger coil arrangement 100 for a measuring device, in particular an electronic balance operating according to the principle of electromagnetic force compensation (not shown in more detail).

The plunger coil arrangement 100 has a pot magnet 102, which is shown with its essential components, and a plunger coil 104 of the measuring device extending into the pot magnet (the remainder of the measuring device being omitted from the view). The plunger coil 104 is arranged on an element of the measuring device, for example on a lever arm of an electronic balance operating according to the principle of electromagnetic force compensation, wherein a force acting on the element is transmitted to the plunger coil, possibly with a certain leverage ratio.

The pot magnet 102 has a housing 106 with an interior 108 in which a magnet unit 110 is arranged. The pot magnet 102, in particular the housing 106 and the magnet unit 110, can be designed to be essentially rotationally symmetrical with respect to the rotational axis A. However, this is not necessarily required, wherein in such cases the axis A can be understood as the longitudinal extension direction of the respective components. The magnet unit 110 comprises a permanent magnet 112, which in the embodiment shown is designed as a ring magnet with axial magnetization. The ring magnet 112 may, as in the illustrated embodiment example, have a circular cross-section outer circumference and a circular cross-section aperture. The bottom face (underside) of the permanent magnet 112 is bonded to a housing bottom surface 114 of the interior 108 of the housing 106. The adhesive material layer 116 has a thickness $d_K$. The annular magnet 112 has a central, coaxial recess through which projects a fastening device 118 for a pole plate 120 which is further included in the magnet unit 110 and which, like the fastening device 118, is arranged essentially without contact with the permanent magnet 112 in the interior 108 of the housing 106. The pole plate 120 is arranged above the upper face (top) of the permanent magnet 112, wherein an air gap with a gap width du is provided between the underside of the pole plate and the top of the permanent magnet. In the illustrated embodiment example, the pole plate 120 has a cylindrical (in particular circular-cylindrical) shape, wherein the circumferential surface of the pole plate 120 is axially aligned with the circumferential surface of the permanent magnet 112.

In the embodiment example shown in FIG. 1, the fastening device 118 is formed as a support element 122, which projects with a circular cylindrical portion 124 through the axial recess of the permanent magnet 112. At the upper and lower ends of the circular cylindrical portion 124, the support element has a threaded pin 126, the lower threaded pin 126 engaging in a threaded bore in the base of the housing 106 and the upper threaded pin 126 engaging in a threaded bore (starting from the underside) of the pole plate 120. Between the cylindrical portion 124 and each of the threaded pins 126, the support element 122 has a stop shoulder that engages the housing bottom surface 114 and the bottom surface of the pole plate 120, respectively, the axial length of the cylindrical portion 124 between the two stop shoulders defining the distance between the housing bottom surface 114 and the bottom surface of the pole plate 120. This distance is chosen to give a predetermined value for the gap width $d_L$.

The permanent magnet 112 and the pole plate 120 are each arranged in the interior 108 of the housing 106 in such a way that an annular gap is formed between the outer circumference of the permanent magnet 112 and the pole plate 120 and the circumferential surface of the interior 108, in which the plunger coil 104 engages. The pole plate 120 serves to equalize and, above all, to concentrate the magnetic field generated by the permanent magnet 112 in the annular gap. Preferably, the annular gap has a constant gap width (in planes perpendicular to the longitudinal axis of the permanent magnet or ring magnet 112) around the pole plate 120 over its entire circumference. The circumferential surface of the interior 108 does not necessarily have to be strictly circular-cylindrical with a constant radius. Rather, it may be advantageous if the circumferential surface or the inner wall of the interior 108 has a projection, wherein the circumferential surface in the area of the projection has a smaller radius than above or below the projection.

The fastening device 118 formed by the support element 122 for the pole plate 120 is mechanically rigid in such a way that, in the event of mechanical loads within a predetermined scope, no relative movements between the pole plate 120 and the housing 106 (for example tilting or wobbling movements of the pole plate about one or two axes perpendicular to one another in a horizontal plane) (or a plane parallel to the bottom surface 114 of the housing 106) occur, or at most movements within a predetermined tolerance. This can ensure that even in the event of vibrations or other shocks during a measurement, the position of the pole plate within the housing 106 and thus the position of the pole plate relative to the plunger coil 104 is sufficiently constant so that no influences or only influences within a predetermined tolerance occur on the measurement result.

As explained above, changes in the position of the pole plate in any form (i.e. tilting movements and translational movements of the pole plate that have a component in the direction of the axis of the plunger coil or permanent magnet) affect the measurement accuracy. For this reason, a mechanically rigid connection between the pole plate 120 and the housing 106 was also selected, wherein such a mechanically rigid connection between the components pole plate 120, fastening device 118, and housing 106 can be made in particular by a screw (threaded) connection, welding or by the relevant manufacture of two of these components in each case. A connection by pure bonding or using materials that undergo a change in volume under environmental influences, in particular temperature and humidity, for example by swelling as a result of stored moisture, is excluded.

While the pole plate 120 includes a ferromagnetic material, in particular a ferromagnetic metal, for example steel, the fastening device 118, in particular the support element 122, should include a non-ferromagnetic material. This achieves magnetic insulation between the pole plate 120 and the housing 106, which is also made of a ferromagnetic material, i.e., a magnetic short circuit between these components is avoided. This results in the desired high density of field lines, i.e., the desired high magnetic flux, in the annular gap, in particular between the pole plate 120 and the housing 106.

The arrangement of the magnet 112 on the housing bottom surface 114 has the advantage over the design according to DE 10 2017 110 9 30 B4 in that the mass held by means of the mechanically rigid fastening device 118 is significantly lower. Consequently, the fastening device 118 can be dimensioned smaller or lighter, or it can have a much greater rigidity with the same dimensioning, so that there is less relative movement between the pole plate 120 and the housing 106 with the same mechanical load.

Furthermore, the design of a pot magnet 102 explained above also ensures the advantage that the sum of the gap widths between the housing bottom surface 114 and the underside of the permanent magnet 112 $d_K$ and the top surface of the permanent magnet 112 and the underside of the pole plate 120 $d_L$ remains constant even if the ambient conditions change, in particular the humidity and/or the temperature. This is because if the gap width $d_K$ changes in one direction, the gap width $d_L$ changes in the opposite direction. If, for example, the gap width $d_K$ increases as a result of increased humidity and/or increased temperature, the gap width $d_L$ decreases by the same amount. As a result, the magnetic resistance of the gaps caused by the adhesive layer 116 and the air layer remains approximately constant, even if the individual gap widths change (in opposite directions).

Figure 2:
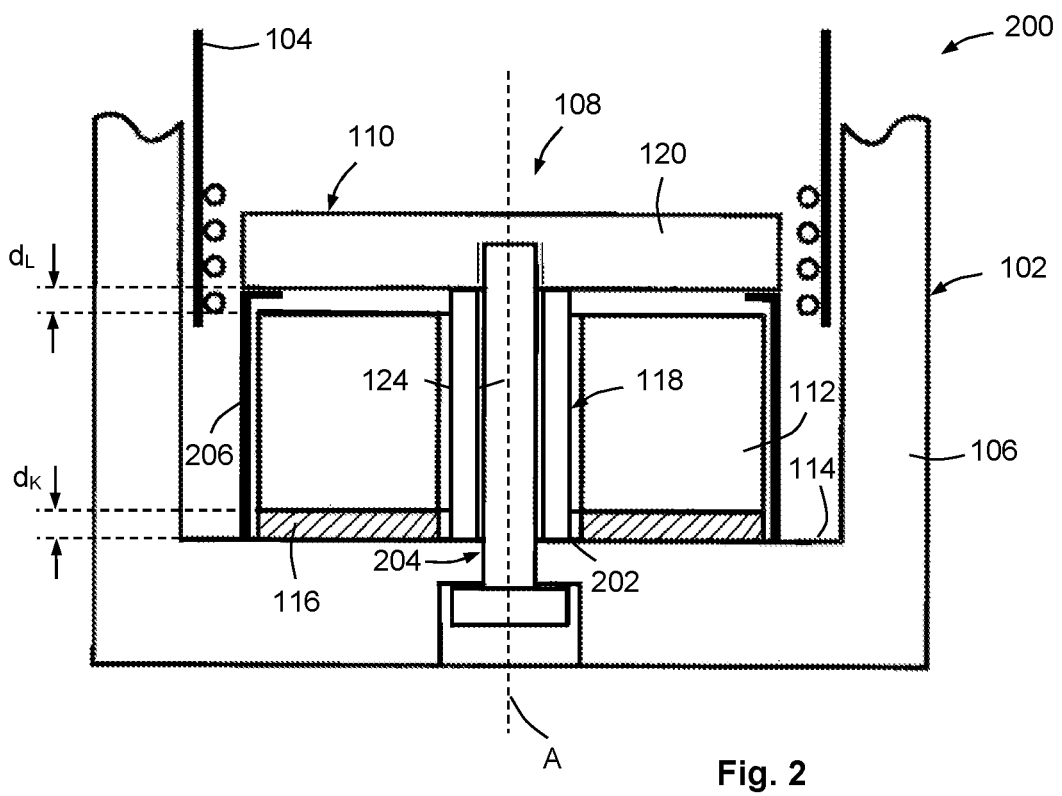
FIG. 2 shows a second embodiment of a pot magnet according to the invention with a central support element coaxially engaging through the permanent magnet; which comprises a spacer sleeve and a screw engaging through it, and with an additional support element surrounding the permanent magnet.

FIG. 2 shows a further embodiment of a plunger coil arrangement 200, in which identical or similar parts or components are designated with identical reference signs as in the embodiment according to FIG. 1.

Unlike the embodiment shown in FIG. 1, the support element in the plunger coil arrangement 200 is formed by a spacer sleeve 202 and a screw 204 extending through the spacer sleeve. The screw 204 protrudes through a central bore in the bottom of the housing 106, wherein the bore may be wider at the bottom of the housing bottom to accommodate the screw head. In this regard, neither the screw 204 or the spacer sleeve 202 should be made of a ferromagnetic material, in particular a ferromagnetic metal, to avoid a path for magnetic flux and thus a magnetic short. In any case, the spacer sleeve 202 must be made of a material that is insensitive to changes in environmental conditions, in particular a change in humidity (in terms of a change in its volume, in particular its length).

In this embodiment of a two-part support element shown in FIG. 2, exact positioning of the spacer sleeve (to ensure contact-free assembly with respect to the permanent magnet 112) can be achieved by the screw being guided precisely (and without play or with a very small play) in the bore in the housing base, and by the spacer sleeve 202 also engaging around the screw 204 without play or with a very small play. In addition, the end faces of the spacer sleeve that interact with the housing bottom surface 114 or the underside of the pole plate 120 should be formed exactly perpendicular to the relevant surfaces, so that the spacer sleeve is positioned exactly perpendicular to the housing bottom surface 114 or in alignment with the longitudinal axis of the screw. Alternatively or additionally, for positioning the spacer sleeve 202 and thus also the pole plate 120, recesses may be formed on the underside of the pole plate 120 and/or in the housing base, into which the respective ends of the spacer sleeve 202 engage without play or with a very small play. Such fastening measures using recesses can also be transferred to other elements, for example to the spacer elements 206 (see below).

Although it has been assumed above that the fastening device 118 is intended to be provided substantially free of contact with the permanent magnet 112, contact may generally be present if the fastening device is configured such that no substantial clamping forces act between the permanent magnet and the fastening device. The clamping forces must be low enough to prevent a stick-slip effect between the permanent magnet 112 and the fastening device 118, for example the support element 122, in the event of an axial change in position of the permanent magnet 112. This would cause sudden movements of the permanent magnet, which would lead to vibrations and thus to a falsification of the measurement result. Thus, instead of a completely contact-free arrangement of the fastening device 118 with respect to the permanent magnet 112, a contacting arrangement can also be provided if sufficient sliding capacity between the components facing each other is ensured, for example by an appropriate choice of material and/or an additional conductive layer in the form of a liquid or a gel-like substance between the contact surfaces.

To assemble the embodiments explained above according to FIGS. 1 and 2, for example, the permanent magnet 112 can first be bonded to the housing bottom surface 114. This can be done, for example, by previously inserting a centering element in place of the support element, the centering element having a diameter corresponding to the inner diameter of the aperture of the permanent magnet 112. After the adhesive has cured, the centering element can be removed again and the support element 122, which has a smaller outer diameter than the aperture of the permanent magnet 112, can be inserted in its place. In this way, contact-free assembly between the fastening device 118 and the permanent magnet can take place.

If the assembly should provide for contact between the fastening device 118 and the permanent magnet 112, the fastening device, e.g., the support element 122 or also the spacer sleeve 202 in conjunction with the screw 204, can also simultaneously serve as a centering device during the assembly.

It is also possible to provide centering aids for the permanent magnet 112 at the bottom of the housing 106. For example, the bottom surface may have abutment surfaces which engage the circumferential surface of the permanent magnet 112 for the purpose of centering. As shown schematically in FIG. 1, such abutment surfaces may be formed by one or more protrusions 128 provided on the bottom of the housing. For example, three protrusions may be provided angularly spaced 120° apart. Such a protrusion may also extend around the entire circumference of the permanent magnet 112. The height of the protrusion or protrusions 128 should be relatively small to avoid a stick-slip effect between the permanent magnet 112 and the protrusion or its abutment surface when the thickness $d_K$ of the adhesive layer 116 changes. For example, the height of such a stop surface should be selected such that it does not overlap the height of the permanent magnet (i.e., the axial extent of the permanent magnet) by more than 5 to 15 percent when the permanent magnet 112 is assembled or bonded.

Such an assembly aid in the form of protrusions or stop surfaces can of course also be provided in the embodiment shown in FIG. 2.

In the embodiment shown in FIG. 2, the fastening device additionally has at least one spacer element 206 (peripheral support element). This can be connected to the pole plate 120, for example. The spacer element 206 can be designed as a hollow cylinder with a predetermined (preferably relatively small) wall thickness. The height or axial extent of the hollow cylinder corresponds to the spacer sleeve 202. It can also be minimally larger, so that a pre-tension is created in the at least one spacer element 206 by means of the screw 204 when the screw 204 is tightened to such an extent that the spacer sleeve is acted upon both from the underside of the pole plate 120 and from the bottom surface. Instead of one hollow cylindrical spacer element 206, several spacer elements, for example three, can of course also be arranged distributed over the circumference of the pole plate, for example at an angular spacing of 120°.

The embodiment according to FIG. 2 can also be modified in such a way that a cylindrical magnet is used instead of a ring magnet 112 and that the fastening device 118 has only the at least one peripheral support element surrounding the magnet. This can already be connected to the pole plate 120 before assembly. For example, such a peripheral support element may be substantially hollow-cylindrical in shape (as shown in FIG. 2) and have at its lower end one or more outwardly and circumferentially extending flange(s) extending outwardly from the lower or bottom end. The outer circumference of the flange (in a horizontal plane or in a plane parallel to the housing bottom surface 114) can then be connected to the housing, for example screwed to the bottom of the pot. The outer periphery of the flange may be formed to serve as a centering means when installing the pole plate with the peripheral support element thus formed, the outer periphery of the flange interacting with the inner surface of the housing interior 108 in such a way that a precisely defined (unique) position for the pole plate and the support element is obtained.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Terms of relative position such as "top," "bottom," "upper," and "lower," for example used in the claims with reference to the orientation of the example embodiments shown in the figures.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE LIST

100 Plunger coil arrangement
102 Pot magnet
104 Plunger coil
106 Housing
108 Interior
110 Magnet unit
112 Permanent magnet
114 Housing bottom surface
116 Adhesive layer
118 Fastening device
120 Pole plate
122 Support element
124 Cylindrical portion
126 Threaded pin
128 Protrusion
200 Coil arrangement
202 Spacer sleeve
Screw
206 Spacer element (Peripheral support element)
$d_K$ Gap width of the adhesive layer
$d_L$ Gap width of the air layer
A Axis of rotation (longitudinal direction)

The inventioni claimed is:
1. A pot magnet for a plunger coil arrangement, the pot magnet including:
   (a) a housing having a housing interior defined by a housing bottom surface and a housing interior peripheral surface extending perpendicular to the housing bottom surface;
   (b) a permanent magnet unit arranged in the housing interior, the permanent magnet unit including a permanent magnet and a pole plate;
   (c) wherein the permanent magnet unit is located in the housing interior such that an annular plunger coil receiving gap is formed between a circumferential surface of the pole plate and the housing interior peripheral surface;
   (d) wherein the permanent magnet is bonded to the housing bottom surface with an underside of the permanent magnet facing the housing bottom surface and with an adhesive material layer with a thickness $d_K$ formed between the housing bottom surface and the underside of the permanent magnet;
   (e) wherein the pole plate is connected to the housing by a rigid fastening device which positions the pole plate such that a lower side of the pole plate faces an upper side of the permanent magnet and a pole plate gap of width d is formed between the lower side of the pole plate and the upper side of the permanent magnet; and (f) wherein the rigid fastening device includes a support element that extends through an opening in the permanent magnet without interfering contact between the support element and the permanent magnet.

2. The pot magnet of claim 1 wherein the support element extends through the opening in the permanent magnet with no contact between the support element and the permanent magnet.

3. The pot magnet of claim 1 wherein the support element includes one or both of an upper threaded connection to the pole plate and a lower threaded connection to the housing.

4. The pot magnet of claim 1 wherein the support element includes:

(a) an upper stop surface interacting with the lower side of the pole plate: and
(b) a lower stop surface interacting with the housing bottom surface.

5. The pot magnet of claim 4 wherein the support element includes a screw and a spacer sleeve, wherein the screw passes through the spacer sleeve, and wherein the spacer sleeve forms the upper stop surface and the lower stop surface.

6. The pot magnet of claim 1 wherein the rigid fastening device includes at least one peripheral support element supporting the pole plate with respect to the housing bottom surface, each peripheral support element being arranged at a respective peripheral location about an outer periphery of the permanent magnet without interfering contact with the permanent magnet.

7. The pot magnet of claim 6 wherein each support member is located out of contact with the permanent magnet.

8. The pot magnet of claim 6 wherein the rigid fastening device includes a single peripheral support element having a hollow-cylindrical shape in cross-section along a plane perpendicular to a longitudinal axis of the housing and wherein the permanent magnet is located within the hollow-cylindrical shape.

9. The pot magnet of claim 6 wherein the at least one peripheral support element is connected to the pole plate.

10. The pot magnet of claim 6 wherein the at least one peripheral support element is connected to the housing.

* * * * *